UNITED STATES PATENT OFFICE 2,297,194

OZONE RESISTANT CABLE INSULATION

Ernst Badum, Bergisch-Gladbach, Germany; vested in the Alien Property Custodian

No Drawing. Application December 21, 1938, Serial No. 247,048. In Germany December 27, 1937

3 Claims. (Cl. 260—42)

Rubber cables are often used as leads for high tension installations, Röntgen apparatus and neon illuminating tubes for example. Rubber cables of this type must be particularly capable of resisting ozone. Greater resistance to ozone is indeed obtained by using synthetic rubber instead of natural rubber, but with lengthy operation synthetic rubber is also destroyed by ozone.

According to the invention, cable that resists ozone is obtained in that it is provided with a protective layer and/or insulation made of a mixture of synthetic rubber with polyvinyl chloride. A desirable mixture ratio has proved to be some 10% to 50% of polyvinyl chloride and 90% to 50% of synthetic rubber to correspond. The mixture ratio may be varied within the limits given, and may be varied beyond these limits depending upon additional properties, such as flexibility for example, that may be desired.

The mixing is effected in known wise in a rubber mixing drum. In accordance with the invention the polyvinyl chloride may hereby be added to the mixture with or without the addition of softeners. Mixed polymerizates of butadienes and acrylic acid nitrile have shown themselves to be particularly adapted to use as synthetic rubber.

The ozone resistant cable may in the first place be cased in known wise in a rubber insulation, with a protective layer according to the invention above this, whereby the protective layer is preferably united with the rubber insulation without a gap. Intermediate layers, which are made of mixtures of the insulating substance and of the protective layer material, may also be disposed between the insulation and the protective layer, in order to procure a gradual transition from the one layer to the other. The protective layers may be disposed both on the conductor and also on the insulation or else over a common jacket or casing with three-phase line cables, or a number of protective layers may be used simultaneously for one cable at various places of its structure.

I claim:

1. An electrical conductor insulation having a high longevous resistance to ozone comprising a body of mixed polymerizates of butadienes and acrylic acid nitrile synthetic rubber compound mechanically and intimately mixed with 10 to 50 per cent by weight of polyvinyl chloride as a filler.

2. A material for covering insulated electrical conductors comprising an intimate mechanical mixture of polyvinyl chloride and polymerizates of butadienes and acrylic acid nitrile, the proportions of polyvinyl chloride being from approximately 10 to 50 per cent of the weight of the whole compound.

3. The improvement in synthetic rubber insulation of the type composed of mixed polymerizates of butadienes and acrylic acid nitrile, comprising a mechanical mixture of such synthetic rubber compounds with 10 to 50 parts by weight of polyvinyl chloride to impart to said compound a high and longevous resistance to ozone.

ERNST BADUM.